United States Patent [19]

Sugihara et al.

[11] 4,134,262
[45] Jan. 16, 1979

[54] EXHAUST GAS CATALYTIC CONVERTER SYSTEM

[75] Inventors: Kunihiko Sugihara, Yokohama; Tadashi Nagai, Yokosuka; Yoshifumi Hase, Yokohama, all of Japan

[73] Assignee: Nissan Motor Company, Limited, Japan

[21] Appl. No.: 725,128

[22] Filed: Sep. 20, 1976

Related U.S. Application Data

[63] Continuation of Ser. No. 519,286, Oct. 30, 1974, abandoned.

[51] Int. Cl.² ..................... F02B 75/10; F01N 3/15
[52] U.S. Cl. .................................... 60/289; 60/294; 60/301; 422/170
[58] Field of Search ............... 60/301, 289, 290, 294; 423/213.7; 23/288 FB

[56] References Cited

U.S. PATENT DOCUMENTS

| 3,662,540 | 5/1972 | Murphey | 60/301 |
| 3,757,521 | 9/1973 | Tourtellotte | 60/301 |
| 3,809,743 | 5/1974 | Unland | 60/301 |
| 3,825,654 | 7/1974 | Kobylinski | 60/301 |
| 3,826,089 | 7/1974 | Nakajima | 60/290 |
| 3,872,213 | 3/1975 | Haseba | 423/213.7 |
| 3,931,710 | 1/1976 | Hartel | 60/276 |
| 3,943,709 | 3/1976 | Holt | 60/301 |

Primary Examiner—Douglas Hart

[57] ABSTRACT

An additional oxidation catalyst containing section is disposed in engine exhaust gas passageway upstream of a reduction catalyst containing section in said exhaust gas passageway at a location downstream of which an oxidation catalyst containing section is disposed.

9 Claims, 3 Drawing Figures

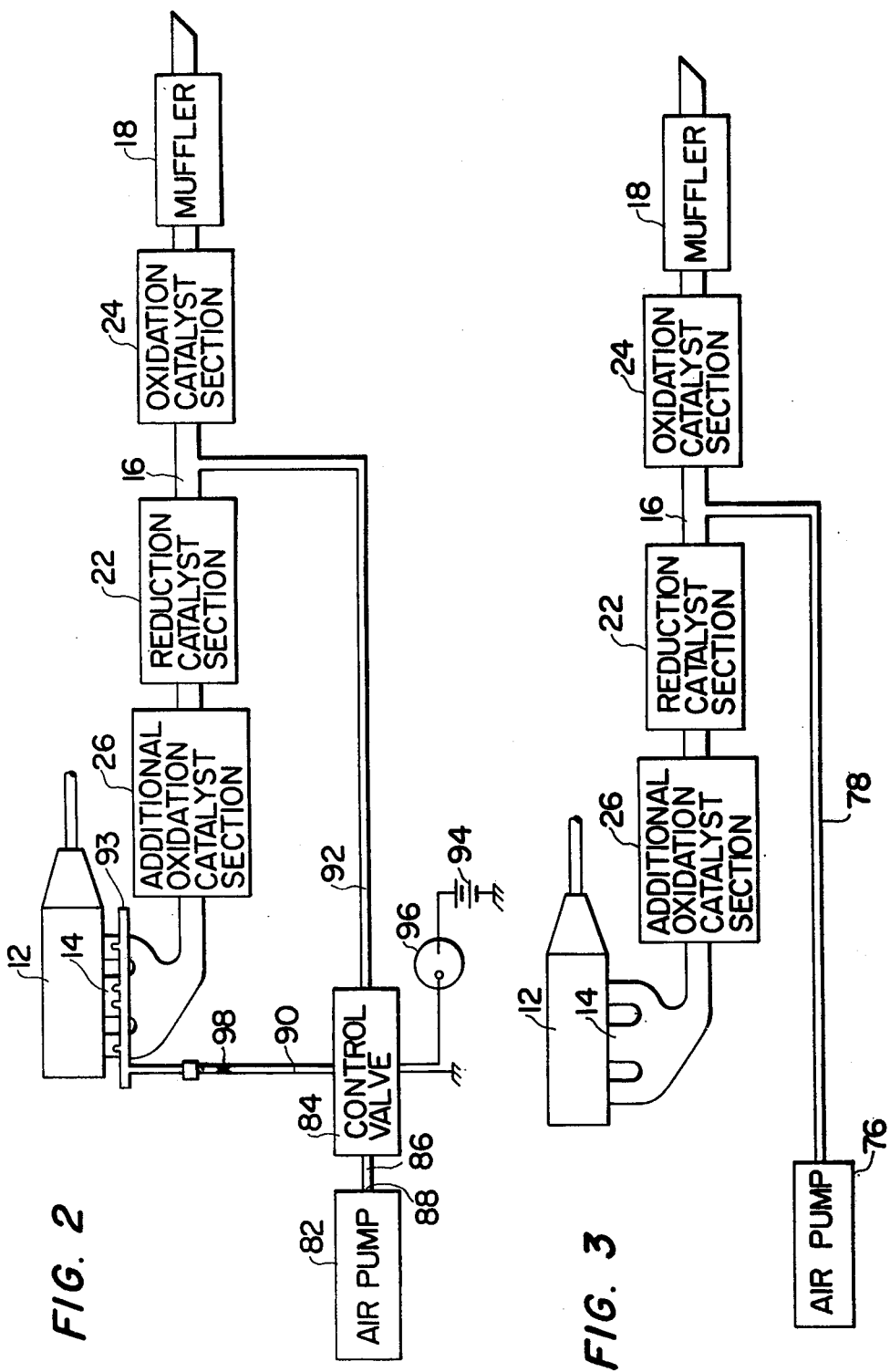

EXHAUST GAS CATALYTIC CONVERTER SYSTEM

This is a continuation of application Ser. No. 519,286, filed Oct. 30, 1974, now abandoned.

The present invention relates generally to a catalytic converter system for catalytically converting noxious components present in the exhaust gas discharged from internal combustion engines to innocuous compounds to prevent discharge of noxious components into the atmosphere and thereby prevent atmospheric pollution.

As is well known in the art, a typical catalytic converter system includes a first stage catalyst section which is disposed in the engine exhaust gas passageway and which contains a suitable reduction catalyst therein, and a second stage catalyst section which is disposed in the exhaust gas passageway at a location downstream of the first stage catalyst section and which contains a suitable oxidation catalyst therein. In the first stage catalyst section, nitrogen oxides (NOx) in the engine exhaust gas are catalytically reduced in contact with the reduction catalyst and in the presence of carbon monoxide (CO) in accordance with the reaction:

$$2NO + 2CO \rightarrow N_2 + 2CO_2$$

In the second stage catalyst section, hydrocarbons (HC) and carbon monoxide (CO) in the exhaust gas are catalytically oxidized in contact with the oxidation catalyst and in the presence of oxygen in accordance with the respective reactions:

$$2CO + O_2 \rightarrow 2CO_2$$

$$HC + O_2 \rightarrow H_2O + CO_2 \text{ ( not stoichiometric)}$$

Oxygen consumed in the second stage catalyst section is obtained from secondary air fed into the exhaust gas prior to contact with the catalyst or air excessive in comparison with fuel which air is drawn into the engine during decelerating operation, and passes the first stage catalyst section without being consumed therein.

In such a catalytic converter system, if a reduction catalyst retained in a first stage catalyst section is a metal such as Monel metal which is an alloy of Ni-Cu-Fe, it is necessary to limit the oxygen content in the engine exhaust gas fed into the first stage catalyst section to a value lower than a considerably low value, for example, 1 percent. The purpose of this is to prevent the metallic reduction catalyst from becoming fragile and from being broken when exposed to a high temperature in the presence of oxygen.

It is, therefore, an object of the invention to provide a novel and improved catalytic converter system in which a reduction catalyst containing section is fed with engine exhaust gas containing no oxygen or an oxygen content reduced to a value lower than a predetermined value.

This and other objects and advantages of the invention will become more apparent from the following detailed description taken in conjunction with the accompanying drawings in which:

FIG. 2 is a schematic view of a second preferred embodiment of a catalytic converter system according to the invention; and FIG. 3 is a schematic view of a third preferred embodiment of a catalytic converter system according to the invention.

Figure 1:
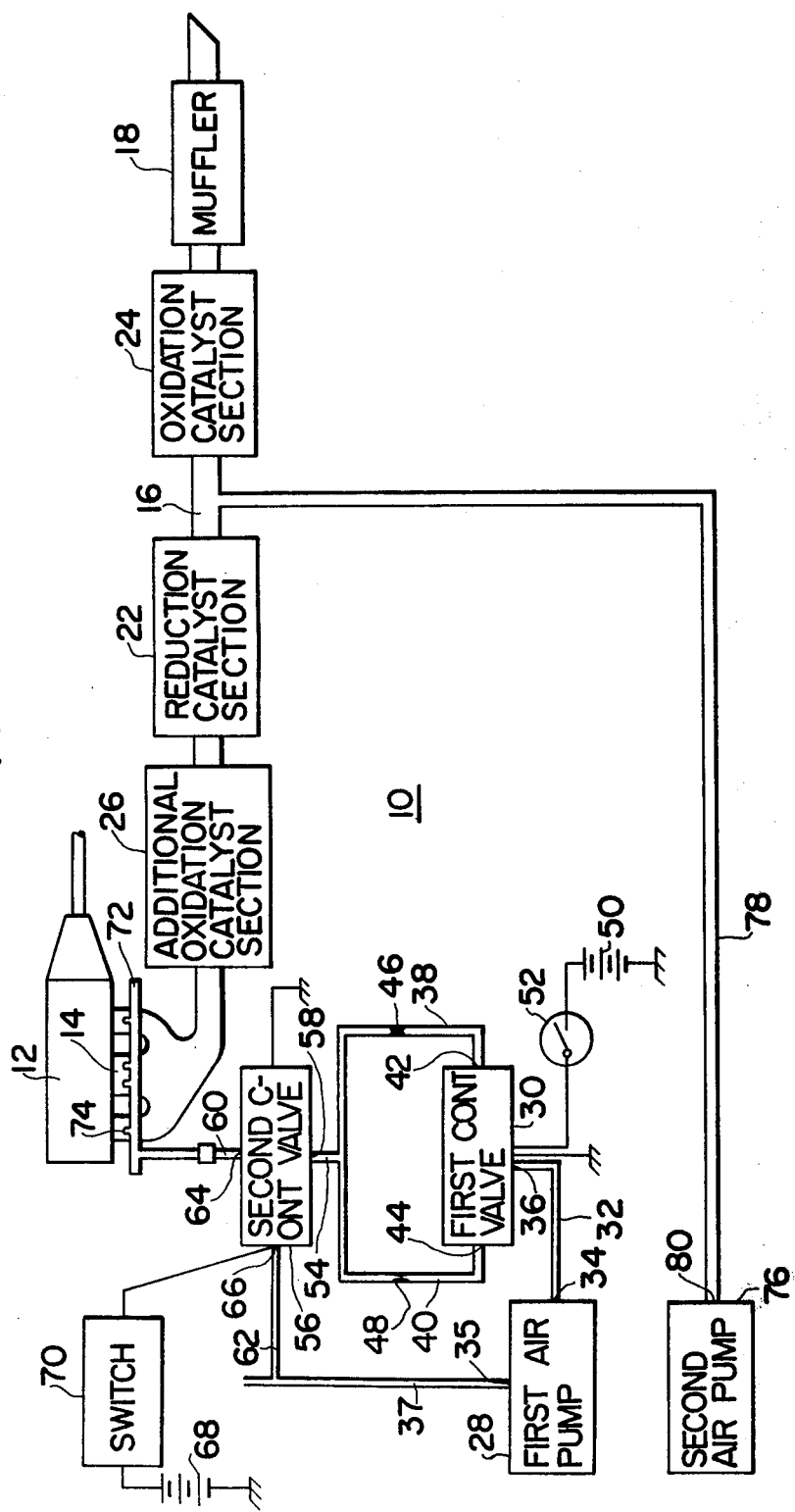
FIG. 1 is a schematic view of a first preferred embodiment of a catalytic converter system according to the invention.

Referring to FIG. 1, a catalytic converter system according to the invention, generally designated by the reference numeral 10, is shown as being incorporated into the exhaust system of an internal combustion engine 12 which includes, as customary, an exhaust manifold 14 leading from a combustion chamber (not shown) of the engine 12, an exhaust pipe or conduit 16 connected with the exhaust manifold 14 and vented to the outside atmosphere by way of a muffler or silencer 18.

The catalytic converter system 10 comprises a reduction catalyst section 22 which is disposed in the exhaust conduit 16 and retains a suitable reduction catalyst (not shown) therein which catalytically promotes reduction of nitrogen oxides in engine exhaust gas, an oxidation catalyst section 24 which is disposed in the exhaust conduit 16 at a location downstream of the reduction catalyst section 22 containing a suitable oxidation catalyst (not shown) therein which catalytically promotes oxidation of hydrocarbons and carbon monoxide in the exhaust gas, and an additional oxidation catalyst section 26 disposed in the exhaust conduit 16 at a location upstream of the reduction catalyst section 22 retaining a suitable oxidation catalyst (not shown) therein which catalytically promotes oxidation of hydrocarbons and carbon monoxide in the exhaust gas to consume oxygen in the exhaust gas to reduce the oxygen content therein to a value lower than a predetermined value, for example, even to zero. A first air pump 28 is provided to supply secondary air to the exhaust gas fed to the additional oxidation catalyst section 26. The air pump 28 pumps or discharges secondary air to a first secondary air control three-way valve 30 by way of a conduit 32 which interconnects an outlet or discharge port 34 of the pump 28 and an inlet port 36 of the valve 30. An inlet or suction port 35 of the air pump 28 may be connected with an air cleaner (not shown) of the engine 12 by way of a conduit 37 as shown in FIG. 1. The control valve 30 is operable to deliver secondary air to one of conduits 38 and 40 which are connected with outlet ports 42 and 44, respectively, of the valve 30. The control valve 30 is operated by a solenoid (not shown) which is electrically connected with an electric power source 50 such as a battery by way of a switch 52 which responds to the temperature of the engine 12. The engine temperature is sensed or checked by a factor such as the temperature of engine coolant or engine oil (not shown). The switch 52 is normally open to de-energize the solenoid during normal engine operation when the temperature of the engine 12 is higher than a predetermined value which may be, for example, 60° C. and closed to energize the solenoid during cold engine operation when the temperature of the engine 12 is lower than the predetermined value. The control valve 30 is operated to provide communication between the conduits 32 and 38 and block communication between the conduits 32 and 40 during normal engine operation, and is shifted to provide communication between the conduits 32 and 40 and block communication between the conduits 32 and 38 during cold engine operation. The conduits 38 and 40 are provided therein with restrictions or orifices 46 and 48 which limit or meter the flows of air passing through the conduits 38 and 40, respectively. The diameter or cross sectional area of the orifice 46 is determined to meter the amount of secondary air fed into the exhaust gas to a predetermined value to meet the requirement that only a part of each of hydrocarbons and carbon monoxide in the exhaust gas is catalytically oxidized in the additional oxidation catalyst section 26 and as a result, all oxygen or the greater part of oxygen in the exhaust gas with oxygen added from the secondary air is wholly consumed in the additional oxidation catalyst section 26 to reduce the oxygen content in the exhaust gas to a value lower than a predetermined value, for example, even to zero. Although the diameter or cross sectional area of the orifice 48 is determined similarly to that of the orifice 46 as set forth above, it is determined to furthermore meter the amount of secondary air fed into the exhaust gas to meet a further requirement that, since the concentrations of hydrocarbons and carbon monoxide are greatly increased and the oxygen content in the exhaust gas is low during cold engine operation, a larger quantity of secondary air is fed into the exhaust gas during cold engine operation as compared with secondary air fed into the exhaust gas during normal engine operation, so that the oxidizing reaction is promoted in the additional oxidation catalyst section 26 to quickly increase the temperature of the exhaust gas causing the reduction and oxidation catalysts in the reduction and oxidation catalyst sections 22 and 24 to quickly reach their catalytically effective or active temperatures and at the same time to lighten the burden of the oxidation catalyst section 24. As a result, the diameter or cross sectional area of the orifice 48 shall be greater than that of the orifice 46. The conduits 38 and 40 are combined to a conduit 54 which is connected with an inlet port 58 of a second secondary air control three-way valve 56. The control valve 56 is operable to deliver secondary air to one of conduits 60 and 62 which are connected with outlet ports 64 and 66 of the valve 56, respectively. The control valve 56 is operated by a solenoid (not shown) which is electrically connected with an electric power source such as a battery 68 by way of a switch 70 which is actuated in response to decelerating operation of the engine 12. The switch 70 is normally open to de-energize the solenoid and closed to energize the solenoid during decelerating operation of the engine 12. The control valve 56 is operated to provide communication between the conduits 54 and 60 and block communication between the conduits 54 and 62 during normal engine operation when the solenoid is de-energized, and is shifted to provide communication between the conduits 54 and 62 and block communication between the conduits 54 and 60 during engine decelerating operation when the solenoid is energized. The conduit 60 is connected with an air gallery or air distributing pipe or conduit 72 which has a plurality of secondary air injection nozzles 74 opening into the exhaust manifold 14 at locations adjacent to exhaust ports (not shown) of the engine 12 for injection of secondary air into the exhaust manifold 14. The conduit 62 is vented to the outside atmosphere or may be connected with the conduit 37 which interconnects the air cleaner and the suction port 35 of the pump 28. A second air pump 76 is provided to supply secondary air to the exhaust gas fed to the oxidation catalyst section 24. The air pump 76 pumps or discharges secondary air to the exhaust conduit 16 at a location between the reduction and oxidation catalyst sections 22 and 24 by way of a conduit 78 connected with an outlet or discharge port 80 of the air pump 76. The amount of the secondary air fed from the conduit 78 shall be sufficient to catalytically oxidize the total amounts of hydrocarbons and carbon monoxide in the exhaust gas. Each of the air pumps 28 and 76 may be driven by the engine 12 or any other suitable means such as an electric motor.

The operation of the catalytic converter system 10 according to the invention thus constructed is as follows:

When the engine 12 is in a normal operating condition, the switches 52 and 70 are open so that the control valve 30 provides communication between the conduits 32 and 38 and the control valve 56 provides communication between the conduits 54 and 60. Secondary air discharged from the air pump 28 is metered by the orifice 46. As a result, a relatively small quantity of secondary air insufficient to catalytically oxidize the total amounts of hydrocarbons and carbon monoxide in engine exhaust gas in the oxidation catalyst section 26 is injected from the injection nozzles 74 into the exhaust manifold 14 and mixed with the exhaust gas discharged from the engine 12. The exhaust gas with oxygen from the secondary air added is fed into the additional oxidation catalyst section 26 and a part of each of hydrocarbons and carbon monoxide in the exhaust gas is catalytically oxidized by reaction with oxygen in the exhaust gas by contact with the oxidation catalyst and rendered harmless. These reactions are expressed as

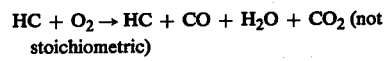
$HC + O_2 \rightarrow HC + CO + H_2O + CO_2$ (not stoichiometric)

and

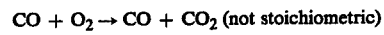
$CO + O_2 \rightarrow CO + CO_2$ (not stoichiometric)

As a result, all oxygen or the greater part of oxygen in the exhaust gas fed into the oxidation catalyst section 26 is entirely consumed to reduce the oxygen content in the exhaust gas to a value lower than a predetermined value, even to zero, a part of each of hydrocarbons and carbon monoxide in the exhaust gas remains unreacted and carbon monoxide is produced. Thus, the exhaust gas with high carbon monoxide content and extremely low or zero oxygen content is fed into the reduction catalyst section 22 and all nitrogen oxides in the exhaust gas are catalytically reduced by the reaction of nitrogen oxides with carbon monoxide in the exhaust gas by contact of nitrogen oxides with the reduction catalyst and rendered harmless, as expressed by:

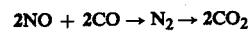
$2NO + 2CO \rightarrow N_2 + 2CO_2$ set forth hereinbefore. The exhaust gas delivered from the reduction catalyst section 22 contains no nitrogen oxides. Secondary air discharged from the air pump 76 is injected into the exhaust conduit 16 by way of the conduit 78 and mixed with the exhaust gas from the reduction catalyst section 22. The exhaust gas with oxygen added from secondary air is fed into the oxidation catalyst section 24 and the total amounts of hydrocarbons and carbon monoxide in the exhaust gas are entirely catalytically oxidized by the reaction with oxygen in the exhaust gas by contact with the oxidation catalyst and rendered harmless, as expressed by reactions

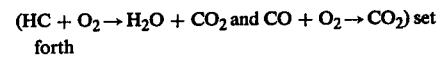
$(HC + O_2 \rightarrow H_2O + CO_2$ and $CO + O_2 \rightarrow CO_2)$ set forth hereinbefore.

When the engine 12 is decelerating, the switch 70 is closed so that the control valve 56 is shifted to provide communication between the conduits 54 and 62 and block communication between the conduits 54 and 60. As a result, secondary air delivered to the control valve 56 is discharged to the outside atmosphere or is returned to the conduit 37 by way of the conduit 62 and accordingly no secondary air is injected into the exhaust manifold 14. Thus, the oxygen content in the exhaust gas fed into the reducing catalyst section 22 is prevented from being excessively high to prevent the reducing catalyst from becoming fragile and being deteriorated during engine decelerating operation when the hydrocarbon and carbon monoxide contents and the oxygen content in engine exhaust gas both are high.

During cold engine operation when the temperature of the engine 12 is lower than a predetermined value, for example, 60° C., the switch 52 is closed so that the control valve 30 is shifted to provide communication between the conduits 32 and 40 and block communication between the conduits 32 and 38. Secondary air discharged from the air pump 28 is metered by the orifice 48. As a result, a relatively large quantity of secondary air as compared with secondary air fed during normal engine operation but which is insufficient to catalytically oxidize the total amounts of hydrocarbons and carbon monoxide in engine exhaust gas in the additional oxidation catalyst section 26 and which meets the further requirement stated hereinbefore is injected from the injection nozzles 74 and mixed with exhaust gas discharged from the engine 12. The exhaust gas with oxygen added from the secondary air is fed into the additional oxidation catalyst section 26 and a part of each of hydrocarbons and carbon monoxide in the exhaust gas is catalytically oxidized and rendered harmless to reduce the oxygen content in the exhaust gas to a value lower than a predetermined value, for example, even to zero. All nitrogen oxides in the exhaust gas discharged from the oxidation catalyst section 26 is catalytically reduced and rendered harmless in the reduction catalyst section 22. Secondary air is fed into the exhaust gas discharged from the reduction catalyst section 22. The total amounts of hydrocarbons and carbon monoxide in the exhaust gas with oxygen added from the secondary air are catalytically oxidized and rendered harmless in the oxidation catalyst section 24.

Referring to FIGS. 2, there is shown a second embodiment of a catalytic converter system according to the invention which is different from the catalytic converter system 10 shown in FIG. 1 in that secondary air is alternatively fed into the exhaust manifold 14 and the exhaust conduit 16 at a location between the reduction and oxidation catalyst sections 22 and 24 by a single air pump 82. As stated, like component elements are designated by the same reference numerals as those used in FIG. 1. In the catalytic converter system shown in FIG. 2, an air pump 82 discharges secondary air to a secondary air control three-way valve 84 by way of a conduit 86 which is connected with a discharge port 88 of the pump 82. The control valve 84 is operable to alternatively deliver secondary air to conduits 90 and 92 which are connected respectively with an air gallery 93 similar to the air gallery 72 of FIG. 1 with the exhaust conduit 16 at a location between the reduction and oxidation catalyst sections 22 and 24. The control valve 84 is operated by a solenoid (not shown) which is connected with an electric power source 94 such as a battery by way of a switch 96 similar to the switch 52 of FIG. 1. The control valve 84 is operated to provide communication between the conduits 86 and 90 and between the conduits 86 and 92 so that secondary air is fed into both the exhaust manifold 14 and the exhaust conduit 16 at a location between the reduction and oxidation catalyst sections 22 and 24 during cold engine operation when the temperature of the engine 12 is lower than a predetermined value, for example, 60° C., and is shifted to provide communication between the conduits 86 and 92 and block communication between the conduits 86 and 90 so that secondary air is fed only into the exhaust conduit 16 at a location between the catalyst sections 22 and 24 during normal engine operation when the temperature of the engine 12 is higher than the predetermined value. Oxygen for catalytic oxidation of a part of each of hydrocarbons and carbon monoxide in engine exhaust gas in the additional oxidation catalyst section 26 is obtained from the exhaust gas with a low oxygen content during normal engine operation. The conduit 90 is formed therein with an orifice 98 having a diameter or a cross sectional area which is determined to limit or meter the amount of secondary air fed into the exhaust manifold 14 to a predetermined value to meet the requirement that only a part of each of hydrocarbons and carbon monoxide in the exhaust gas is catalytically oxidized in the additional oxidation catalyst section 26 so that all oxygen or the greater part of oxygen in the exhaust gas with oxygen added from the secondary air is consumed in the additional oxidation catalyst section 26 to reduce the oxygen content in the exhaust gas to a value lower a predetermined value, even to zero, and a further requirement that the oxidizing reaction is promoted in the additional oxidation catalyst section 26 to quickly increase the temperature of the exhaust gas causing the oxidation, reduction and oxidation catalysts in the oxidation, reduction and oxidation catalyst sections 26, 22 and 24 to quickly reach their catalytically effective or active temperatures and at the same time to lighten the burden of the oxidation catalyst section 24 during cold engine operation when the concentrations of hydrocarbons and carbon monoxide are greatly increased and the oxygen content in the exhaust gas is low.

The operation of the catalytic converter system shown in FIG. 2 thus constructed is as follows:

When the engine 12 is in a normal operating condition, the switch 96 is open so that the control valve 84 provides communication only between the conduits 86 and 92 to feed secondary air only into the exhaust conduit 16 at a location between the catalyst sections 22 and 24. The exhaust gas discharged from the engine 12 is fed into the additional oxidation catalyst section 26 and a part of each of hydrocarbons and carbon monoxide in the exhaust gas is catalytically oxidized and rendered harmless. As a result, all oxygen or the greater part of oxygen in the exhaust gas is consumed to reduce the oxygen content therein to a value lower than a predetermined value, for example, even to zero, and carbon monoxide is produced. Thus, the exhaust gas with high carbon monoxide content and extremely low or zero oxygen content is fed into the reduction catalyst section 22 and all nitrogen oxides in the exhaust gas are catalytically reduced and rendered harmless. Secondary air discharged from the conduit 92 is fed into the exhaust gas delivered from the reduction catalyst section 22 containing no nitrogen oxides. The exhaust gas with oxygen added from secondary air is fed into the oxidation catalyst section 24 and the total amounts of hydrocarbons and carbon monoxide in the exhaust gas are entirely catalytically oxidized and rendered harmless.

When the engine 12 is in a cold operating condition, the switch 96 is closed so that the control valve 84 provides communication between the conduits 86 and 92 and between the conduits 86 and 90 to feed secondary air into the exhaust manifold 14 as well as the exhaust conduit 16. Secondary air fed into the exhaust manifold 14 is metered by the orifice 98 in the conduit 90. The exhaust gas with oxygen added from the secondary air is fed into the additional oxidation catalyst section 26 and a part of each of hydrocarbons and carbon monoxide in the exhaust gas is catalytically oxidized therein to reduce the oxygen content in the exhaust gas to a value lower than a predetermined value, for example, even to zero and simultaneously the temperature of the exhaust gas is quickly increased to cause the oxidation catalyst in the additional oxidation catalyst section 26 to quickly reach its catalytically active temperature. The exhaust gas discharged from the oxidation catalyst section 26 is successively fed into the reduction and oxidation catalyst sections 22 and 24 and is fed with secondary air prior to entrance into the catalyst section 24. As a result, all nitrogen oxides and the total amounts of hydrocarbons and carbon monoxide in the exhaust gas are catalytically reduced and oxidized, respectively and rendered harmless and simultaneously the reduction and oxidation catalysts in the reduction and oxidation catalyst sections 22 and 24 are caused to quickly reach their catalytically active temperatures, similarly as described hereinbefore.

Referring to FIG. 3, there is shown a third embodiment of a catalytic converter system according to the invention which is different from the catalytic converter system 10 shown in FIG. 1 in that a single air pump 76 is provided to feed secondary air into the engine exhaust gas in exhaust conduit 16 at a location between reduction and oxidation catalyst sections 22 and 24 by a conduit 78 during engine operation as in the catalytic converter system 10 of FIG. 1. In the operation of the catalytic converter system of FIG. 3, the exhaust gas discharged from the engine 12 is fed into the additional oxidation catalyst section 26 and a part of each of hydrocarbons and carbon monoxide in the exhaust gas is catalytically oxidized to reduce the oxygen content therein to a value lower than a predetermined value, even to zero. All nitrogen oxides in the exhaust gas discharged from the additional oxidation catalyst section 26 are catalytically reduced in the reduction catalyst section 22. Secondary air is fed into the exhaust gas discharged from the reduction catalyst section 22. The total amounts of hydrocarbons and carbon monoxide in the exhaust gas are catalytically oxidized in the oxidation catalyst section 24, similarly as described hereinbefore.

It will be appreciated that a catalytic converter system according to the invention has a technical advance in that a reduction catalyst section is fed with engine exhaust gas containing no oxygen or an oxygen content reduced to a value lower than a predetermined value so that a metallic reduction catalyst in the reduction catalyst section is securely prevented from becoming fragile and from being broken, by providing an additional oxidation catalyst section in an exhaust gas conduit at a location upstream of the reduction catalyst section.

What is claimed is:

1. A catalytic converter system for an internal combustion engine, comprising a reduction catalyst section containing a reduction catalyst therein and disposed in the flow of exhaust gas, discharged from an internal combustion engine, to catalytically reduce nitrogen oxides in said engine exhaust gas, an oxidation catalyst section containing an oxidation catalyst therein and disposed in said engine exhaust gas flow at a location downstream of said reduction catalyst section to catalytically oxidize hydrocarbons and carbon monoxide in said engine exhaust gas, an additional oxidation catalyst section containing an oxidation catalyst therein and disposed in said engine exhaust gas flow at a location upstream of said reduction catalyst section to catalytically oxidize a part of each of hydrocarbons and carbon monoxide in said engine exhaust gas to consume oxygen in said engine exhaust gas, an air pump discharging secondary air under pressure, passage means communicating with said air pump and with said engine exhaust gas flow at a location upstream of said additional oxidation catalyst section and feeding said secondary air from said air pump into said engine exhaust gas flow at the last-mentioned location, and control means controlling the amount of said secondary air fed through said passage means into said engine exhaust gas flow at said last-mentioned location in accordance with an operating condition of said engine to limit the oxygen content in said engine exhaust gas fed from said additional oxidation catalyst section to said reduction catalyst section to a value below a predetermined value and comprising valve means disposed in said passage means and controlling the same, and valve control means controlling said valve means in accordance with an operating condition of said engine, in which said passage means comprises first and second parallel conduits communicating with said engine exhaust gas flow at said last-mentioned location and alternatively communicable with said air pump and formed therein with orifices, respectively, the cross sectional area of each of which being determined to limit the amount of said secondary air passing therethrough to said engine exhaust gas flow at said last-mentioned location to reduce the oxygen content in said engine exhaust gas fed from said additional oxidation catalyst section to said reduction catalyst section to a value below said predetermined value, the cross sectional area of said orifice of said first conduit being smaller than that of said orifice of said second conduit, said valve means comprises a three-way valve disposed between said air pump and said conduits and alternatively providing fluid communication between said air pump and said first conduit and between said air pump and said second conduit, and said valve control means comprises a switch controlling said three-way valve in accordance with the temperature of said engine, said switch being responsive to a temperature of said engine above a predetermined level to cause said three-way valve to provide fluid communication between said air pump and said first conduit and to a temperature of said engine below said predetermined level to cause said three-way valve to provide fluid communication between said air pump and said second conduit.

2. A catalytic converter system as claimed in claim 1, in which said valve means further comprises a second three-way valve disposed between said conduits and said engine exhaust gas flow at said last-mentioned location and alternatively providing fluid communication between said conduits and said engine exhaust gas flow at said last-mentioned location and between said conduits and the outside atmosphere, and said valve control means further comprises a second switch normally causing said second three-way valve to provide fluid communication between said conduits and said engine exhaust gas flow at said last-mentioned location and responsive to decelerating operation of said engine to cause said second three-way valve to provide fluid communication between said conduits and the outside atmosphere.

3. A catalytic converter system as claimed in claim 2, further comprising a second air pump discharging secondary air under pressure, and a conduit interconnecting said second air pump and said engine exhaust gas flow a location between said reduction catalyst section and the first-mentioned oxidation catalyst section and feeding said secondary air from said second air pump into said engine exhaust gas flow at the last-mentioned location.

4. A catalytic converter system for an internal combustion engine, comprising a reduction catalyst section containing a reduction catalyst therein and disposed in the flow of exhaust gas, discharged from said internal combustion engine, to catalytically reduce nitrogen oxides in said engine exhaust gas, an oxidation catalyst section containing an oxidation catalyst therein and disposed in said engine exhaust gas flow at a location downstream of said reduction catalyst section to catalytically oxidize hydrocarbons and carbon monoxide in said engine exhaust gas, an additional oxidation catalyst section containing an oxidation catalyst therein and disposed in said engine exhaust gas flow at a location upstream of said reduction catalyst section to catalytically oxidize a part of each hydrocarbons and carbon monoxide in said engine exhaust gas to consume oxygen in said engine exhaust gas, an air pump discharging secondary air under pressure, passage means communicating with said air pump and with said engine exhaust gas flow at a location upstream of said additional oxidation catalyst section and feeding said secondary air from said air pump into said engine exhaust gas flow at the last-mentioned location, and valve means disposed in said passage means and controlling the amount of said secondary air fed through said passage means into said engine exhaust gas flow at said last mentioned location in accordance with an operating condition of said engine to limit the oxygen content in said engine exhaust gas fed from said additional oxidation catalyst section to said reduction catalyst section to a value below a predetermined value, in which said passage means comprises first and second parallel conduits communicating with said engine exhaust gas flow at said last-mentioned location and alternatively communicable with said air pump and formed therein with orifices, respectively, the cross sectional area of each of which being determined to limit the amount of said secondary air passing therethrough to said engine exhaust gas flow at said last-mentioned location to reduce the oxygen content in said engine exhaust gas fed from said additional oxidation catalyst section to said reduction catalyst section to a value below said predetermined value, the cross sectional area of said orifice of said first conduit being smaller than that of said orifice of said second conduit, said valve means comprises a three-way valve disposed between said air pump and said conduits and alternatively providing fluid communication between said air pump and said first conduit and between said air pump and said second conduit, and a switch controlling said three-way valve in accordance with the temperature of said engine, said switch being responsive to a temperature of said engine above a predetermined level to cause said three-way valve to provide fluid communication between said air pump and said first conduit and to a temperature of said engine below said predetermined level to cause said three-way valve to provide fluid communication between said air pump and said second conduit.

5. A catalytic converter system for an internal combustion engine, comprising a first oxidation catalyst section disposed in the flow of exhaust gas discharged from said engine and containing an oxidation catalyst to catalytically oxidize a part of each of hydrocarbons and carbon monoxide in said engine exhaust gas, a reduction catalyst section disposed in said engine exhaust gas flow at a location downstream of said first oxidation catalyst section and containing a reduction catalyst to catalytically reduce nitrogen oxides in said engine exhaust gas, a second oxidation catalyst section disposed in said engine exhaust gas flow at a location downstream of said reduction catalyst section and containing an oxidation catalyst to catalytically oxidize hydrocarbons and carbon monoxide in said engine exhaust gas, passage means communicating with said engine exhaust gas flow at a location upstream of said first oxidation catalyst section, an air pump communicating with said passage means and discharging pressurized secondary air thereinto which is fed into said engine exhaust gas flow at the last-mentioned location, valve means disposed in said passage means and controlling the amount of secondary air fed into said engine exhaust gas flow at said last-mentioned location to limit the oxygen content in said engine exhaust gas fed into said reduction catalyst section to a value below a predetermined value, a solenoid for operating said valve means, and switch means electrically connected to said solenoid and for controlling said solenoid in accordance with an operating condition of said engine, in which said passage means comprises first and second parallel conduits communicating with said engine exhaust gas flow at said last-mentioned location and alternatively communicable with said air pump and formed therein with orifices, respectively, the cross sectional area of each of which being determined to limit the amount of secondary air passing therethrough to said engine exhaust gas flow at said last-mentioned location to reduce the oxygen content in said engine exhaust gas fed from said first oxidation catalyst section to said reduction catalyst section to a value below said predetermined value, the cross sectional area of said orifice of said first conduit being smaller than that of said orifice of said second conduit, said valve means comprising a three-way valve disposed between said air pump and said conduits and alternatively providing communication between said air pump and said first conduit and between said air pump and said second conduit, said switch means comprising a switch controlling said solenoid in accordance with the temperature of said engine, said switch being responsive to temperatures of said engine above and below said predetermined level to cause said solenoid to operate said three-way valve communication between said air pump and said first conduit and between said air pump and said second conduit, respectively.

6. A catalytic converter system as claimed in claim 5, further comprising a second three-way valve disposed between said conduits and said engine exhaust gas flow at said last-mentioned location and alternatively providing communication between said conduits and said engine exhaust gas flow at said last-mentioned location and between said conduits and the outside atmosphere, and a second switch normally causing said second three-way valve to provide communication between said conduits and said engine exhaust gas flow at said last-mentioned location and responsive to decelerating operation of said engine to cause said second three-way valve to provide communication between said conduits and the outside atmosphere.

7. A catalytic converter system as claimed in claim 6, further comprising a second air pump discharging secondary air under pressure, and a conduit communicating said second air pump with said engine exhaust gas flow at a location between said reduction catalyst section and said second oxidation catalyst section and feeding secondary air from said second air pump into said engine exhaust gas flow at the last-mentioned location.

8. A catalytic converter system in combination with an internal combustion engine including
an exhaust gas passageway providing communication between the engine and the atmosphere for conducting thereto exhaust gases of the engine, said catalytic converter system comprising
a first oxidation catalyst section disposed in the exhaust gas passageway and containing
an oxidation catalyst for catalytically oxidizing a part of each of hydrocarbons and carbon monoxide in the engine exhaust gases;
a reduction catalyst section disposed in the exhaust gas passageway downstream of said first oxidation catalyst section and containing
a reduction catalyst for catalytically reducing nitrogen oxides in the engine exhaust gases;
a second oxidation catalyst section disposed in the exhaust gas passageway downstream of said reduction catalyst section and containing
an oxidation catalyst for catalytically oxidizing hydrocarbons and carbon monoxide in the engine exhaust gases;
an air pump producing pressurized secondary air;
passage means communicating with said air pump and alternatively communicable with the exhaust gas passageway at a location upstream of said first oxidation catalyst section and with the atmosphere;
a three-way valve disposed in said passage means and having a first position in which it provides communication between said passage means and the exhaust gas passageway at said location and a second position in which it provides communication between said passage means and the atmosphere;
a switch for sensing deceleration of the engine and normal operations of the engine excepting deceleration; and
a solenoid for operating said three-way valve, said solenoid being electrically connected to said switch for causing said three-way valve to move into said first positiin in response to normal operations of the engine sensed by said switch and for causing said three-way valve to move into said second position in response to deceleration of the engine sensed by said switch, in which said passage means is branched off at its portion upstream of said three-way valve into
first and second passage means alternatively communicable with said air pump and formed therein with first and second orifices, respectively, the cross sectional area of said first orifice being larger than that of said second orifice, said catalytic converter system further comprising
a further three-way valve located between said air pump and both said first and second passage means and having a third position in which it provides communication between said air pump and said first passage means and a fourth position in which it provides communication between said air pump and said second passage means,
a further switch for sensing the temperature of the engine, and
a further solenoid for operating said further three-way valve, said further solenoid being electrically connected to said further switch for causing said further three-way valve to move into said third position in response to a temperature of the engine sensed by said further switch which is below a predetermined value and for causing said further three-way valve to move into said fourth position in response to a temperature of the engine sensed by said further switch which is above said predetermined value.

9. A catalytic converter system in combination with an internal combustion engine including
an exhaust gas passageway providing communication between the engine and the atmosphere for conducting thereto exhaust gases of the engine, said catalytic converter system comprising
a first oxidation catalyst section disposed in the exhaust gas passageway and containing
an oxidation catalyst for catalytically oxidizing a part of each of hydrocarbons and carbon monoxide in the engine exhaust gases;
a reduction catalyst section disposed in the exhaust gas passageway downstream of said first oxidation catalyst section and containing
a reduction catalyst for catalytically reducing nitrogen oxides in the engine exhaust gases;
a second oxidation catalyst section disposed in the exhaust gas passageway downstream of said reduction catalyst section and containing
an oxidation catalyst for catalytically oxidizing hydrocarbons and carbon monoxide in the engine exhaust gases;
an air pump producing pressurized secondary air;
passage means communicating with said air pump and with the exhaust gas passageway at a location upstream of said first oxidation catalyst section;
valve means for controlling the flow of pressurized secondary air fed into the exhaust gas passageway at said location and having a first position in which the flow of said pressurized secondary air is increased and a second position in which the flow of said pressurized secondary air is reduced;
a switch for sensing the temperature of the engine; and
a solenoid for operating said valve means, said solenoid being electrically connected to said switch for causing said valve means to move into said first position in response to a temperature of the engine sensed by said switch which is below a predetermined value and for causing said valve means to move into said second position in response to a temperature of the engine sensed by said switch which is above said predetermined value, in which said passage means comprises
first and second passage means both communicating with the exhaust gas passageway at said location and alternatively communicable with said air pump and formed therein with first and second orifices, respectively, the cross sectional area of said first orifice being greater than that of said second orifice, said valve means comprising
a three-way valve located between said air pump and both said first and second passage means and providing communication between said air pump and said first passage means when in said first position and between said air pump and said second passage means when in said second position.

* * * * *